United States Patent [19]

Brems

[11] Patent Number: 4,819,492

[45] Date of Patent: Apr. 11, 1989

[54] REVERSING MECHANISM HAVING GREAT KINEMATIC VERSATILITY

[76] Inventor: John H. Brems, Apt. 11G, 2800 S. Ocean Blvd., Boca Raton, Fla. 33432

[21] Appl. No.: 81,127

[22] Filed: Aug. 3, 1987

Related U.S. Application Data

[63] Continuation-in-part of Ser. No. 793,558, Oct. 31, 1985, abandoned.

[51] Int. Cl.[4] ............................................. F16H 21/32
[52] U.S. Cl. ............................................. 74/52; 74/394
[58] Field of Search ............................. 74/52, 393, 394

[56] References Cited

U.S. PATENT DOCUMENTS

| | | | |
|---|---|---|---|
| 3,295,380 | 1/1967 | Osborn | 74/44 |
| 3,529,485 | 9/1970 | Kofferlein | 74/394 |
| 3,921,465 | 11/1975 | Hosoda et al. | 74/52 |
| 3,956,942 | 5/1976 | Seki et al. | 74/52 |
| 3,971,261 | 7/1976 | Matsushita | 74/52 |
| 4,023,420 | 5/1977 | Dressler | 74/52 |
| 4,075,911 | 2/1978 | Brems | 74/816 |
| 4,137,797 | 2/1979 | Brems | 74/52 |
| 4,223,568 | 9/1980 | Brems | 74/52 |
| 4,726,240 | 2/1988 | Brems | 74/27 |

*Primary Examiner*—Allan D. Herrmann
*Attorney, Agent, or Firm*—Barnes, Kisselle, Raisch, Choate, Whittemore, Hulbert

[57] ABSTRACT

Mechanisms which can produce, with a constant speed rotary input member, a reciprocating motion capable of producing very long dwells at each end of the stroke of the reciprocating motion, unequally long dwells at opposite ends of a stroke, and/or momentary stops intermediate the ends of the stroke. The mechanism can generate a dwell at each end of the stroke and an additional dwell at a predetermined point along the stroke in one direction of travel and another additional dwell at another predetermined point along the reverse direction of travel. The mechanism is further capable of creating high degrees of kinematic versatility between the ends of the stroke of the reciprocating mechanism.

14 Claims, 4 Drawing Sheets

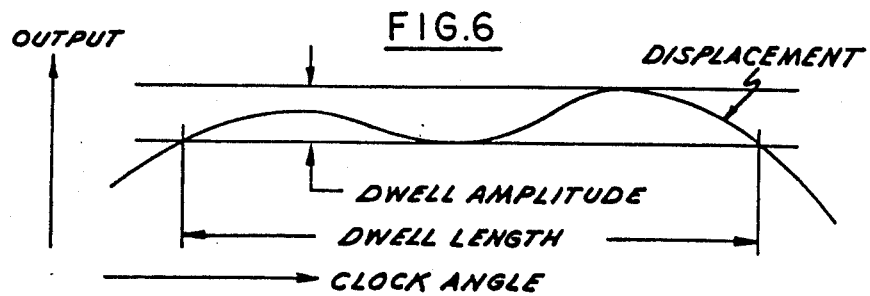
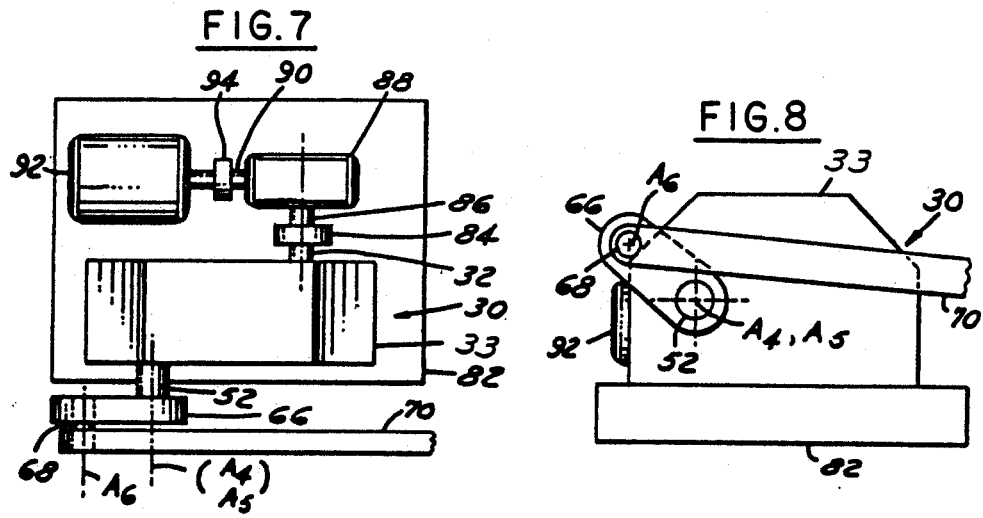
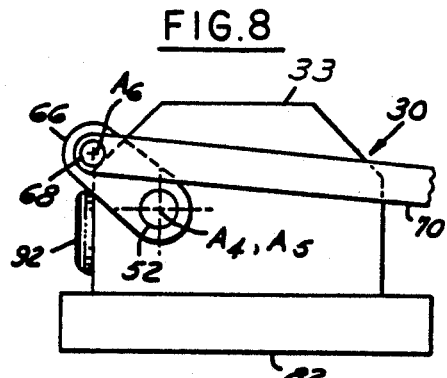
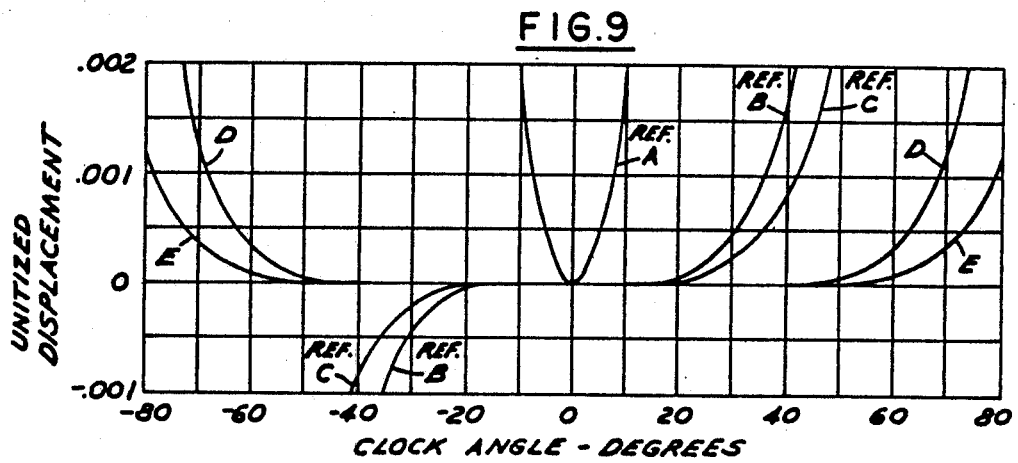
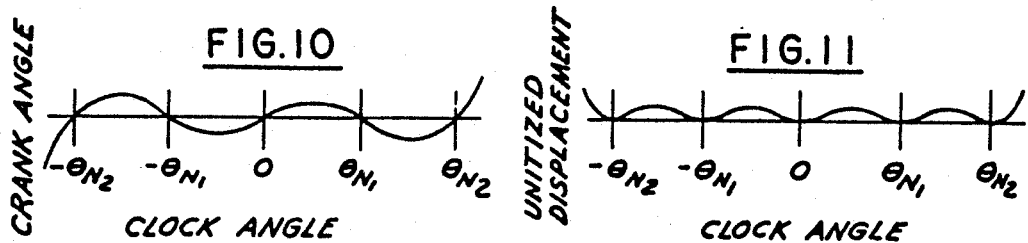
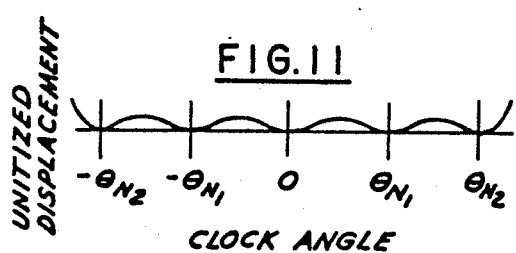

REVERSING MECHANISM HAVING GREAT KINEMATIC VERSATILITY

REFERENCE TO RELATED APPLICATION

This is a continuation-in-part of my copending application, Ser. No. 793,558, filed Oct. 31, 1985, now abandoned.

FIELD OF INVENTION

An inherently reversing mechanism combination which can produce, with a constant speed rotary input, extremely long dwells, and/or an extremely wide variety of predetermined kinematic characteristics between the ends of a stroke, including different characteristics on the reverse stroke as compared with those of the forward stroke.

BACKGROUND AND OBJECTS OF THE INVENTION

In the field of mechanically generated motions, many applications arise in which it is desired to create a reciprocating motion from a rotary motion. These requirements are generally met with the well-known crank and slider mechanism or the related Scotch type yoke mechanism. However, these have a relatively short dwell which is inadequate for some applications.

It is an object of this invention to provide a mechanism which generates a reciprocating motion from a rotary motion and in which the output remains substantially stationary, that is, in dwell for an appreciable fraction of the overall cycle at each end of the reciprocating output stroke.

Motions of this type can also be generated by cam mechanisms, but these are limited practically to strokes of a few feet or less before becoming very expensive.

It is another object of this invention to provide a mechanism which, by its nature, can be economically constructed to achieve strokes of 6 feet or more.

Another object of this invention is to provide a reversing mechanism having a dwell at each end of its stroke and having an additional dwell at a predetermined point along its stroke along one direction of travel and another such additional dwell at another predetermined point along the reverse direction of travel, where such dwells may be instantaneous stops or significant reductions of velocity.

In my copending application, Ser. No. 781,882, filed Sept. 30, 1985, entitled "Reciprocating Long Dwell Mechanism", there is disclosed a mechanism also capable of meeting the aforesaid objectives but whose kinematic versatility, while being very large, is not as great as that of the invention to be described herein. This new invention is capable of creating still longer dwells and/or greater kinematic versatility between the ends of the stroke than that of the aforesaid copending application.

Other objects and features of the invention will be apparent in the following description and claims in which the principle of the invention is disclosed together with details directed to persons skilled in the art to enable the invention to be utilized all in connection with the best modes presently contemplated for the invention.

BRIEF DESCRIPTION OF THE DRAWINGS

Drawings accompany the disclosure and the various views thereof may be briefly described as:

FIG. 6, a schematic diagram illustrating the definitions of dwell length and dwell amplitude.

FIG. 7, a plan view of the mechanical combination comprising this invention.

FIG. 8, a side view of FIG. 7.

FIG. 9, an illustrative graphical presentation of the dwell characteristics of the crank and connecting rod mechanism; the mechanism of FIGS. 1 and 2 operating in the second and third harmonic arrangements with very long dwells; and the combined mechanism of FIGS. 7 and 8.

FIG. 10, a generic dwell characteristic curve showing the behavior of the mechanism of FIGS. 1 and 2 operating in a five point dwell configuration.

FIG. 11, a generic dwell characteristic curve, showing the output of this invention when the crank is positioned on the mechanism of FIGS. 1 and 2, such that the crank is at a dead center position when the mechanism of FIGS. 1 and 2 is in the center of dwell and configured to create a five point dwell.

PRELIMINARY DESCRIPTION OF INVENTION

This invention is the combination of two prior art mechanisms conceived to meet, through mechanical means, a variety of sophisticated kinematic objectives with unusual results. The first of these two prior art mechanisms is comprised of those embodiments of my existing U.S. Pat. No. 4,075,911 which provide a rotary output (as opposed to a linear output). The second of the prior art mechanisms is the known crank and connecting rod mechanism for converting the rotary motion of a shaft into a reciprocation of a slider block or its equivalent. By mounting the crank on the output shaft of the rotary output embodiments of U.S. Pat. No. 4,075,911, an extremely wide range of unexpected kinematic motion patterns can be achieved as will be described through a series of specific examples.

FIRST DWELL MECHANISM—BACKGROUND

In my existing U.S. Pat. No. 4,075,911, a family of mechanisms are disclosed which are capable of generating an intermittent output motion, either linear or rotary, from an input motion rotating at a given constant angular velocity. Subsequently, in this disclosure, the U.S. Pat. No. 4,075,911 will be referred to as the background patent. This patent is incorporated herein by reference. A review of this background patent will indicate that there are several embodiments, e.g., FIGS. 51, 52, 53; 54, 55, 56; 57, 58, 59; 60, 61, 62; 63, 64 and 65, which all provide a rotary output. Specifically referring to FIGS. 51, 52 and 53 of the background patent, it can be seen that the output gear 332 rotates through an angle of 90° during a given index cycle. This is a result of the gear 330 having a pitch radius which is ¼ the pitch radius of the output gear 332. In this present invention which will subsequently be described, that portion of the mechanism arising from the background patent will initially utilize an index angle of approximately 180°. Such a mechanism is described in FIGS. 1 and 2 of the present disclosure.

Figure 1:
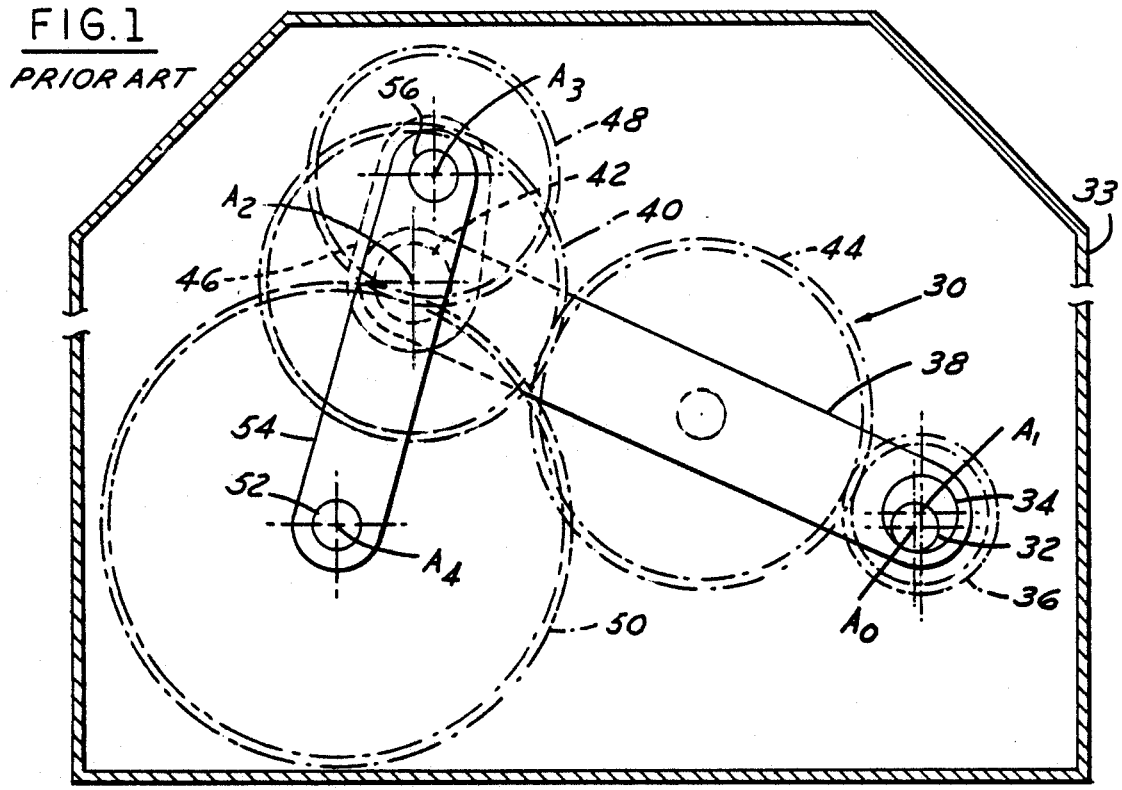
FIG. 1, a side semi-schematic view of one embodiment of my existing U.S. Pat. No. 4,075,911.
Figure 2:
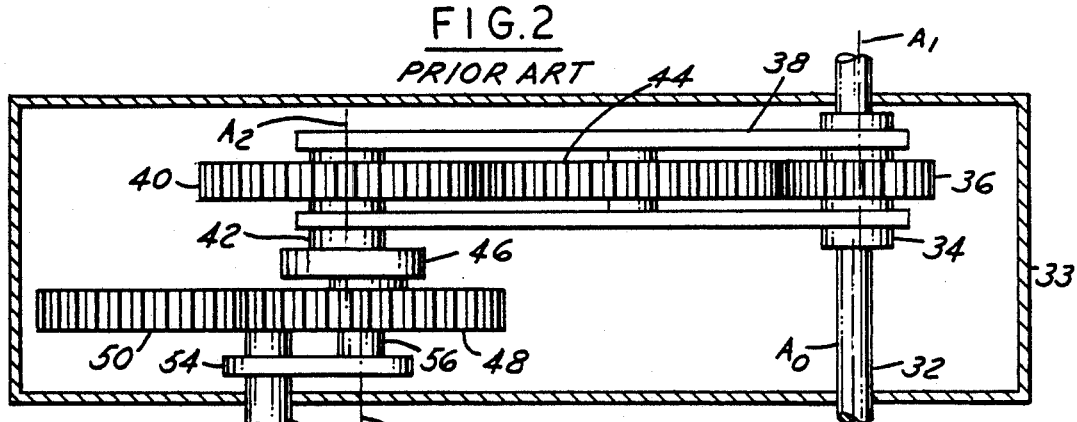
FIG. 2, a top view of FIG. 1.

FIGS. 1 and 2 are simplified schematic drawings of this embodiment which is proportioned to provide a 180° output for one acceleration-deceleration cycle of its output shaft. Referring to FIGS. 1 and 2, this mechanism 30 is comprised of an input shaft 32 which rotates on axis $A_0$ in stationary bearings in a housing 33. An eccentric segment 34, on the shaft 32, is concentric about an axis $A_1$ displaced a small amount from the axis $A_0$. An input gear 36, fastened on the eccentric segment 34, is also concentric about axis $A_1$. Tangential links 38 are journalled on the eccentric segment 34. A driving gear 40 is mounted on a shaft 42 journalled in the tangential links 38 and rotates on a moving axis $A_2$; it is driven by the input gear 36 through an intermediate gear 44 also journalled in the tangential links 38. In this instance, the ratio between the input gear 36 and the driving gear 40 is exactly 2:1, i.e., the input gear 36 rotates two times for every revolution of driving gear 40.

An eccentric plate 46 is mounted on the shaft 42 and in turn supports an eccentric gear 48 concentric about a moving axis $A_3$. This eccentric gear 48 meshes with an output gear 50 mounted on an output shaft 52 rotating on a stationary axis $A_4$ in bearings mounted in the housing 33. The eccentric gear 48 is shown as being one-half the pitch radius of the output gear 50 creating one index cycle for each 180° of rotation of the output gear 50, as will be described. The eccentric gear 48 is held in mesh with the output gear 50 by a radial link 54 which is journalled on the output shaft 52 and on a stub shaft 56 mounted on the eccentric gear 48 concentric about axis $A_3$.

The operation of the mechanism 30, which is analyzed in the reference patent, may be qualitatively and briefly described as follows. The total motion of the output gear is a superposition of a group of individual components, each of which will be individually analyzed as if it were the only component creating a motion of the output gear 50.

Assuming temporarily that the axes $A_0$ and $A_1$ are coincident, and further that the axes $A_2$ and $A_3$ are coincident, it can be seen that the mechanism 30 would, in effect, be a simple gear reducer with the output gear 50 rotating at onefourth the angular velocity of the input gear 36. The ratio from the output gear 50 to its driving "eccentric" gear 40 is 2:1; this gear 40 is coupled to and rotates with the driving gear 48, whose ratio relative to the input gear 36 is also 2:1; hence the 4:1 ratio. Assuming the input shaft 32 rotates at a constant angular velocity, the output shaft 52 would also rotate at a constant angular velocity albeit one-fourth that of the input shaft.

If it is now assumed that the axes $A_2$ and $A_3$ are separated by some distance, it can be seen that the gears 40 and 48 rotate about each other with the centerline $A_3$ of gear 48 oscillating about the axis $A_4$, since the distance between axes $A_3$ and $A_4$ is fixed by link 54; and with axis $A_2$ oscillating the coincident axes $A_0 A_1$ since the distance between axes $A_2$ and $A_1$ is fixed by links 38. The magnitude of these oscillations is determined by the magnitude of the distance between axes $A_2$ and $A_3$, and this would impart an oscillation on the output gear caused by the oscillation of the axis $A_3$ and the eccentric gear 48 about the axis $A_4$.

Similarly, when the axis $A_1$ is displaced from the axis $A_0$, and still assuming that the input shaft 32 is rotating at some constant angular velocity, it can be seen that the axis $A_1$ rotates about the axis $A_0$ creating a circular motion at the right end of the link 38. This in turn superimposes another oscillation on the gear 50 whose amplitude is determined by the spacing of axis $A_1$ from $A_0$. Furthermore, this latter oscillation has a frequency that is double the frequency of the oscillation of the output gear created by the displacement of axis $A_3$ from axis $A_2$ since the input gear 36 rotates at twice the angular velocity as the average angular velocity of the driving gear 40 due to their 2:1 pitch diameter ratios.

The final component of motion of the output gear 50 is created by the angular oscillation of the links 38. As these links move through space with their right ends moving in the circular path created by axis $A_1$ rotating about axis $A_0$, their left ends oscillate up and down about the moving axis $A_1$ as driven by the axes $A_2$ and $A_3$ rotating about each other. This complex motion also creates a slight component of motion in the output gear, which becomes increasingly smaller as the length of the links 38 is increased. The angular oscillation of the links 38 creates a slight change in the projected length of these links on a base line passing through axis $A_0$ and tangential to the output gear 50, and it is this change in projected length which creates the motion component in gear 50. Since the lengthening of the links 38 reduces their angular excursions for given motions of the axes $A_1$ and $A_2$, the projected length variations decrease rapidly with increase in link length.

The total motion of the output gear 50, is thereby created by the superposition of the three primary design components summarized as follows:

1. A constant velocity determined by the gear ratios described.
2. A first oscillating component created by the rotation of axes $A_2$ and $A_3$ about each other.
3. A second oscillating component created by the rotation of axis $A_1$ about axis $A_0$.

Additionally, a fourth incidental component is created inevitably by the angular excursion of the links 38, which can be made very small as their length is increased.

The four components described above create a cyclical variation in the motion of the output gear 50, and a given cycle repeats once for every revolution of the eccentric gear 40. Therefore, for a given cycle, the output gear 50 rotates through an angle represented by the ratio of the pitch radius of the eccentric gear 48 to the pitch radius of the output gear 50. For example, and to the scale shown in FIGS. 1 and 2, in which gear 48 is half as large as gear 50, the output will complete a given cycle in 180° of motion of the output gear 50. If gear 48 were the same size as gear 50, clearly a cycle would take place during a 360° rotation of the output gear 50.

The distance from axis $A_0$ to axis $A_1$ is defined as eccentricity $E_2$, while the eccentricity between axis $A_2$ and axis $A_3$ is defined as eccentricity $E_1$. The addition of this second eccentricity $E_2$, which rotates at an integral multiple number of times for each rotation of the eccentricity $E_1$, makes it possible to achieve a wide variety of kinematic effects on the rotation of the output shaft 52. This is disclosed in considerable mathematical detail in my existing U S. Pat. No. 4,075,911.

The mechanism of FIGS. 1 and 2, designated mechanism 30, is configured to create a relatively long dwell in terms of input angle rotation, in which the dwell is not a true stationary condition of the output shaft, but rather, a small amplitude oscillation of the output shaft about the center of this oscillation, which is defined as the zero point for output angle measurement.

Whereas the rotary output embodiment of the background patent shown in FIGS. 51, 52, 53 therein produced an output index angle of 90°, due to the proportions of gears 330 and 332, the output index angle of the embodiment shown in FIGS. 1 and 2 herein produces an output index angle of 180° as previously described. Furthermore, in the background patent, the mechanism of FIGS. 51, 52, 53 shows a chain connection 322 from the member, sprocket 324, on axis $A_1$ to the member, sprocket 321, on axis $A_2$, whereas in the embodiment, FIGS. 1 and 2, shown herein, this equivalent drive connection is shown as being through gears 36, 44 and 40. This minor structural modification was made to achieve greater drive stiffness.

SECOND DWELL MECHANISM—BACKGROUND

The second background mechanism utilized in the invention of the present disclosure is comprised of a crank and connecting rod mechanism described in many books on fundamental kinematics. It is illustrated here schematically in FIGS. 3, 4 and 5.

Figure 4:
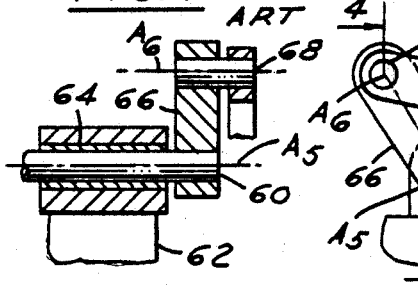
FIG. 4, a section taken on line 4—4 of FIG. 3.
Figure 3:
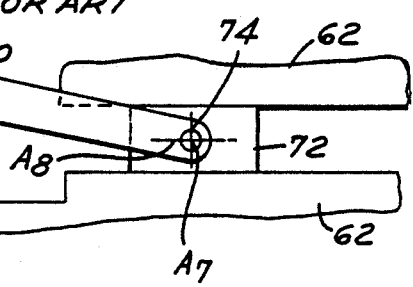
FIG. 3, a side view of the well-known crank and connecting rod mechanism.

Referring to FIGS. 3 and 4, a shaft 60 rotates on axis $A_5$, and is journalled in a frame 62 through a bushing 64; this shaft 60 can e driven by any suitable prime mover.

A crank 66 is fastened to the shaft 60, and at its outer end supports a crankpin 68 concentric about an axis $A_6$. A connecting rod 70 is journalled at its one end on the crankpin 68; at its other end it is pivot connected to a slide block 72 through a pivot pin 74 on axis $A_7$. The slide block 72 is supported by the frame 62 in which it is free to slide along an axis $A_8$, which, as shown in FIG. 3, intersects the axis $A_5$.

Figure 5:
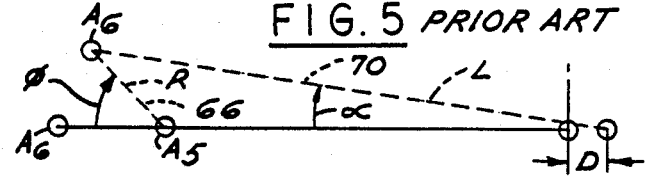
FIG. 5, a schematic diagram of the mechanism of FIG. 3 useful for determining the equations of motion of that mechanism.

In FIG. 5 is shown a schematic diagram useful to analyze the kinematic characteristics of the system. The distance on the crank 66 between axis $A_5$ and $A_6$ is defined as R and the length of the connecting rod between pins 68 and 74 is defined as L. The mechanism is shown in two positions: a base position shown in solid lines (which is the top dead center position) and a position shown in dotted lines after the crank R has rotated from its base position by some arbitrary angle $\phi$. From this diagram, it is easily seen that the amount the slider block 72 has moved from its base position as the crank R moves through the angle $\phi$ from its base position is given by $$D = R - L - R \cos \phi + L \cos \alpha \quad (1)$$

where $$\alpha = \sin^{-1}(R \sin \phi / L) \quad (2)$$

If it is assumed that L is large compared to R and therefore the angle $\alpha$ is small, even when it is at a maximum, then $\cos \alpha$ is very closely approximated by 1, whereupon:

$$D \approx R - R \cos \phi \approx R(1 - \cos \phi) \quad (3)$$

This approximate equation is for the kinematic displacement characteristics of the crank and slider block motion.

DWELL AND CLOCK ANGLE

The term "dwell", in the generally accepted kinematic sense and as applied to any mechanism, is taken to mean that the output of that mechanism is stationary while its input continues to move. In the theoretical sense, the output is zero; cam generated output movements often times incorporate such a dwell as is well known. However, many practical applications arise in which a true zero movement dwell is not required, but in which some very slight oscillatory motion of the output is acceptable. Such a situation will be defined, for the purposes of this disclosure as a "near dwell"; and furthermore, it will be characterized by a numerical value which gives the maximum peak-to-peak amplitude of the output oscillation, expressed as a fraction of the total output stroke of the mechanism. For example, a near dwell (0.001) would mean that the output oscillates during the defined near dwell through a total amplitude of 0.001 times the total stroke of the mechanism. This is shown schematically in FIG. 6 which further schematically defines the term "dwell length". If it is assumed that a mechanism is driven by an input shaft which rotates at a constant angular velocity, and that the time required for a given index cycle is divided into 360 units, then each of those units is defined as 1 degree of clock angle. A dwell length of 90° clock angle, for example, would represent a cycle in which the output would be in near dwell for 90/360 or for one quarter of the cycle. Clearly, if the input shaft rotates through one revolution during an index cycle, then one degree of input shaft rotation equals one degree of clock angle; or, if, for example, the input shaft rotates through three revolutions during an index cycle, than every three degrees of input shaft rotation equals one degree of clock angle. Stated another way, the number of degrees of input shaft rotation equal to one degree of clock angle may be determined by dividing the total number of input shaft rotation degrees required for an index cycle by 360.

MECHANICAL OPERATION OF THE INVENTION

The invention to be described herein is a combination or tandem mechanism employing two drive stages, the first stage of which is comprised of a rotary output indexing mechanism of the type disclosed in the background patent and in FIGS. 1 and 2 herein and having an output index angle of 180° (initially); and the second stage of which is comprised of the crank and connecting rod mechanism described above. This combination of mechanisms is both unique and useful and yields results which can be determined only by detailed analysis which must be made to ascertain the numerous system characteristics achievable.

Referring to FIGS. 7 and 8, the mechanism 30, previously described in connection with FIGS. 1 and 2, is enclosed in the housing 33 and mounted on a base 82. Its input shaft 32 is driven through a coupling 84 by the output shaft 86 of a gear reducer 88 also mounted on the base 82. The input shaft 90 of this gear reducer is in turn driven by a motor 92 through a coupling 94. Depending on the application the motor may run continuously, or it may be stopped during the mechanism dwell with suitable conventional limit switches and electrical circuits. The crank 66 (FIGS. 3, 4 and 5) is directly mounted on the output shaft 52 of the mechanism 30, whereupon axes $A_4$ and $A_5$ become coincident. Clearly the shaft 60 and frame 62 (FIGS. 3 and 4) could be retained and a coupling used to connect shafts 52 and 60 if this were more convenient. The crankpin 68 on crank 66 is used to drive the connecting rod 70 in a reciprocating motion. The other end of the connecting rod 70 is connected to a reciprocating output member, which may be a slider block, such as shown in FIG. 3, from which the load is driven, or the connecting rod 70 may be directly connected to an input member of the load to be driven. Such an input member may be a link, a bellcrank, or a sliding member. In any case, the output movement will be as given by the approximate equation (3) derived above, where the angle $\phi$ is now the output angle of the mechanism 30.

FUNCTIONAL DESCRIPTION OF THE INVENTION

As described in connection with FIGS. 1 and 2, and as more fully described in the background patent, the kinematic behavior of the output shaft 52 can be varied over a very wide range; with the specific arrangement shown in FIGS. 1 and 2 and assuming that the input shaft 32 is driven at some constant angular velocity, the output shaft 52 will repeat a given kinematic cycle for each 180° of output movement since the eccentric gear 48 has a pitch radius equal to one-half of the pitch radius of the output gear 50. Furthermore, with the eccentricity shown between axes $A_2$ and $A_3$ and between axes $A_0$ and $A_1$, a given kinematic cycle is comprised of a stopped position of the output shaft 52, when the various elements are positioned as shown in FIGS. 1 and 2. During two revolutions of the input shaft 32, the eccentric gear 40 will make one revolution smoothly accelerating the output gear 50 and output shaft 52 to a maximum velocity during the first approximate 90° of their rotation and then smoothly decelerating the output gear and shaft to a stopped position during the second 90° of their rotation. Stated another way, during a given kinematic cycle of the mechanism of FIGS. 1 and 2, the input shaft will make two revolutions at a presumed constant angular velocity, the eccentric gear 40 will make one revolution at a varying angular velocity, and the output gear and shaft will move through an angle of 180° from a first stopped position to a second stopped position, at each of which the various elements are positioned as shown in FIGS. 1 and 2.

Given this behavior of the output shaft 52, the resultant behavior of the crank output system can be varied over a wide range depending on the orientation of the crank on the output shaft 52 when the output shaft is in a stopped position. For example, if the crank is positioned on the output shaft 52 in a top or bottom dead center position when the shaft 52 is also in a stopped position, it will be found that the dwell length at each end of the stroke of the total system is very long. This situation will be described in considerable quantitative detail.

On the other hand, it is possible to position the crank on the output shaft 52 such that the crank is in a top or bottom dead center position when the shaft 52 is at some intermediate position between two adjacent stopped or dwell positions. This arrangement gives rise to a variety of kinematic output characteristics, several of which will be subsequently quantitatively analyzed and illustrated.

Furthermore, it is possible to configure the mechanism of FIGS. 1 and 2 such that the output index angle of the shaft 52 between stopped positions is other than the 180° index angle that is generated by the specific mechanism shown (since the eccentric gear 48 has a pitch radius equal to one-half the pitch radius of the output gear 50). For example, if the pitch radius of the eccentric gear 48 is the same as the pitch radius of the output gear 50, the index angle of the output shaft 52 between stops or dwells is 360°. It is, therefore, possible to position the crank 66 on the shaft 52 in a stopped position only with the crank 66 in a top dead center position or bottom dead center position, but not both, as was the case when the mechanism of FIGS. 1 and 2, which is configured to provide a 180° output index angle.

Clearly, the mechanism of FIGS. 1 and 2 can be configured to provide index angles of 90°, 60° or any other useful angle and for each of these angles it is possible to position the crank 66 on the shaft 52, such that the crank 66 is in a top or bottom dead center position when the shaft 52 is in a stopped or dwell position, or at some specified angle away from the stopped position which will be defined as a phase angle. The number of combinations becomes exceedingly large and to show all such combinations becomes prohibitive.

Accordingly, a series of combinations are investigated in quantitative detail, which are perceived to be of practical usefulness.

UNITIZED OUTPUT

For comparative purposes in comparing the dwells, and other characteristics, of the mechanism of FIGS. 1 and 2, the crank mechanism of FIGS. 3 to 5, and the combination mechanism of FIGS. 7 and 8, it is convenient to scale the output of each system such that the index stroke is arbitrarily set to equal 1. Similarly, the input angle is defined in terms of the clock angle which has a range of 360° to create the output stroke of 1. Under these arbitrary scaling procedures, equation (3) becomes $$D_U \approx .5\left[1 - \cos\left(\frac{\phi_C}{2}\right)\right] \quad (4)$$

where
  $D_U$ = "unitized" output
  $\phi_C$ = "clock" angle

This rescaling is dependent on the following reasoning relative to equation (3). The minimum position occurs when $\phi=0$, and D=0 independent of the value of R. The maximum position occurs when $\phi=180°$ and D is equal to 2R. Therefore, by setting R=½ and $\phi=(\phi_C/2)$ the maximum reaches 1 when $\phi=360°$ and it is by substituting these values for R and $\phi$ into equation (3) that equation (4) is obtained.

The output displacement from equation (4), in the near dwell area, is tabulated in Table I and shown graphically by curve Ref A in FIG. 9.

TABLE I

| Unitized Displacement of a Simple Crank Mechanism Near Dwell | |
|---|---|
| Clock Angle | Unitized Displacement |
| −20 | .007596 |
| −15 | .004278 |
| −10 | .001903 |
| −5 | .000476 |
| 0 | 0 |
| 5 | .000476 |
| 10 | .001903 |
| 15 | .004278 |
| 20 | .007596 |

The operation of the mechanism 30, which is analyzed in the reference patent, may be qualitatively and briefly described as follows. The total motion of the output gear is a superposition of a group of individual components, each of which will be individually analyzed as if it were the only component creating a motion of the output gear 50.

Referring to the background patent, the generalized approximate displacement equation, for the situation in which the axis $A_1$ rotates about the axis $A_0$ through two revolutions for one revolution of the axes $A_2$ and $A_3$ about each other, is:

$$U = \theta - E_1 \sin\theta + E_2 \sin 2\theta \quad (5)$$

where
  U = Angular output displacement of output shaft 52, having a range of $2\pi$ units independent of the index angle
  $\theta$ = Clock angle in radians
  $E_1$ = Distance between axes $A_2$ and $A_3$ expressed as a ratio to the radius of the eccentric gear 48
  $E_2$ = Distance between axes $A_1$ and $A_0$ also expressed as a ratio to the radius of the eccentric gear 48

Similarly, if the axis $A_1$ rotates about axis $A_0$ three revolutions for each revolution of the axes $A_2$ and $A_3$ about each other, the generalized approximate displacement equation, from the background patent is:

$$U = \theta - E_1 \sin\theta + E_2 \sin 3\theta \quad (6)$$

From equations (5) and (6), and by reference to the mechanism 30 and the background patent, it can be seen that if the axis $A_1$ rotates about axis $A_0$ N times for each revolution of axes $A_2$ and $A_3$ about each other, as controlled by the ratio between the input gear 36 and the driving gear 40, the generalized approximate displacement equation for the output of the mechanism becomes:

$$U = \theta - E_1 \sin\theta + E_2 \sin N\theta \quad (7)$$

As noted above, the output variable U is scaled to reach $2\pi$ units during an index cycle; furthermore, the input angle, $\theta$, is dimensioned in radians. In order to compare the output of the independent mechanism 30 with the output of the crank and connecting rod mechanism, noted as curve Ref. A, in FIG. 9, it is necessary to rescale equation (7) into unitized coordinates, which is accomplished by multiplying the entire equation by $\frac{1}{2\pi}$ and to convert $\theta$ to the clock angle $\theta_C$, in degrees by setting:

$$\theta = (\pi/180)\phi_C$$

Therefore, equation (7), in unitized coordinates becomes:

$$D_U = \frac{1}{2\pi}\left[\frac{\pi}{180}\phi_C - E_1\sin\phi_C + E_2\sin N\phi_C\right] \quad (8)$$

which reduces to:

$$D_U = \frac{\phi_C}{360} - \frac{E_1}{2\pi}\sin\phi_C + \frac{E_2}{2\pi}\sin N\phi_C \quad (9)$$

In the background patent, it was shown that the longest dwell without reversal, when using N=3, is obtained with $E_1=1.125$, and $E_2=0.04167$ (1/24). Substituting these values into equation (9), the unitized displacement values at various clock angles are found to be:

TABLE II

| Clock Angle | Unitized Displacement |
|---|---|
| −60 | −.011605 |
| −50 | −.005045 |
| −40 | −.001763 |
| −30 | −.000440 |
| −20 | −.000060 |
| −10 | −.000002 |
| 0 | 0 |
| 10 | .000002 |
| 20 | .000060 |
| 30 | .000440 |
| 40 | .001763 |
| 50 | .005045 |
| 60 | .011605 |

This data is also graphically represented by curve Ref. B in FIG. 9.

It was further shown in the background patent that the longest dwell without reversal, when using N=2, is obtained with $E_1=1.33$ (1⅓) and $E_2=0.167$ (1/6). Substituting these values into equation (9), the unitized displacement at various clock angles are found to be:

TABLE III

| Clock Angle | Unitized Displacement |
|---|---|
| −60 | −.005862 |
| −50 | −.002452 |
| −40 | −.000830 |
| −30 | −.000202 |
| −20 | −.000027 |
| −10 | −.000001 |
| 0 | 0 |
| 10 | .000001 |
| 20 | .000027 |
| 30 | .000202 |
| 40 | .000830 |
| 50 | .002452 |
| 60 | .005862 |

This data is also graphically represented by curve Ref. C in FIG. 9. In comparing curves Ref. A, Ref. B, and Ref. Co, two primary points are obvious. First, in comparing the inherent dwells available in the independent mechanisms, the dwells of the mechanism 30 are significantly greater than the dwell which occurs at top dead center or bottom dead center of a crank and connecting rod mechanism.

The second observation concerns the directional behavior of the displacement in the vicinity of the dwell. Relative to the crank and connecting rod mechanism, it can be seen that the displacement on either side of the center of dwell, where the clock angle is 0, which is the top dead center or bottom dead center position, is unidirectional as would be expected with an inherently reversing mechanism such as a crank and connecting rod. On the other hand, it can be seen that, relative to the mechanism 30, the displacement on either side of the center of dwell is bidirectional; this is again as would be expected for an indexing mechanism of this type; i.e., for unidirectional input shaft rotation, the output will momentarily stop after a given index, but then reaccelerate in the same direction it had before stopping.

The foregoing data on the near dwell characteristics of each of the mechanisms operating independently are provided as reference data for the new data to be shown.

In the combination mechanism of FIGS. 7 and 8 which comprises this invention, it is necessary to rescale equation (7) such that it represents the true output angle of the shaft 52 of the mechanism 30. If the number of index cycles per revolution of the output shaft 52 is defined as M, then the instantaneous position $\gamma$ of the shaft 52, as a function of clock angle, can be represented by multiplying the equation (9), for unitized displacement, by 360/M which represents the degrees of rotation per index of shaft 52. Therefore:

$$\gamma = \frac{360}{M} \left[ \frac{\phi_C}{360} - \frac{E_1}{2\pi} \sin\phi_C + \frac{E_2}{2\pi} \sin N\phi_C \right] \quad (10)$$

This reduces to:

$$\gamma = \frac{\phi_C}{M} - \frac{360 E_1}{2\pi M} \sin\phi_C + \frac{360 E_2}{2\pi M} \sin N\phi_C \quad (11)$$

In the combined mechanism of FIGS. 7 and 8, the output angle of the shaft 52, as given by $\gamma$ of equation (11) is equal to the input angle $\phi$ of the crank and connecting rod mechanism of FIG. 5 as approximated by equation (3). It is necessary to introduce a new variable $C_1$, which represents the phase angle in making the connection between the two mechanisms. Given the shaft 52 positioned such that it is positioned between index cycles of the mechanism 30, i.e., the clock angle $\phi_C$ is 0, then the angle that the crank is beyond its dead center position is defined as the phase angle, $C_1$. Therefore, $$\phi = \gamma + C_1 \quad (12)$$

Substituting equation (12) into equation (3):

$$D = R[1 - \cos(\gamma + C_1)] \quad (13)$$

For an output stroke equal to 1, $R = \frac{1}{2}$ $$D_U = \frac{1}{2}[1 - \cos(\gamma + C_1)] \quad (14)$$

If the value for from equation (11) is substituted into equation (14), the unitized displacement equation for the mechanism of this invention is obtained.

$$D_U = \quad (15)$$

$$\frac{1}{2}\left[1 - \cos\left(\frac{\phi_C}{M} - \frac{360 E_1}{2\pi M}\sin\phi_C + \frac{360 E_2}{2\pi M}\sin N\phi_C + C_1\right)\right]$$

There are five parameters in this equation, M, N, $C_1$, $E_1$ and $E_2$, each of which exerts its own influence on the characteristics of the output. Clearly, the number of combinations is extremely large.

A few combinations will be represented to illustrate the influence of these various variables. In these illustrations, the various Tables and curves were calculated using a computer. Velocity, for example, could be calculated using classical mathematical techniques, but it was clearly less laborious and time consuming to use computer numerical differentiation.

Each of the following cases is made clear through detailed quantitative analysis. However, each case was initially theorized through lengthy qualitative mental processes, which, it is believed, demonstrate true and useful invention, as differentiated from a random process of arbitrarily assigning values to $C_1$, M, N, $E_1$, and $E_2$ and evaluating the results. The choices of illustrative useful combinations of these five variables is the crux of this invention and the result of lengthy study.

LONG DWELLS OF EACH END OF STROKE

One of the important practical applications of this invention is to create long dwells at both ends of the stroke. This permits, for example, the operation of other systems while this mechanism is in dwell. By combining the individual mechanisms such that their dwell points are coincident, $C_1 = 0$, and arranging mechanism 30 to have a 180° index angle, M=2, and using the $E_1$ and $E_2$ factors as were determined to give the "flattest" dwells, as obtained from the background patent, the following cases were calculated:

Case 1

$C_1 = 0$; M=2; N=3;
$E_1 = 1.125$; $E_2 = 1/24$.
The results are tabulated in Table IV.

TABLE IV

| Clock Angle | Unitized Displacement |
| --- | --- |
| −80 | .003972 |
| −70 | .001291 |
| −60 | .000332 |
| −50 | .000063 |
| −40 | .000008 |
| −30 to +30 | Less than .000001 |
| 40 | .000008 |
| 50 | .000063 |
| 60 | .000332 |
| 70 | .001291 |
| 80 | .003972 |

These results are also shown as curve D in FIG. 9. Recalling that this dwell curve is the output of the combined mechanism, comprised of the independent mechanisms, whose dwell characteristics are presented in curves Ref. A and Ref. B, it can be seen that the dwell characteristics of the combined mechanism are far better than the mere sum of the dwells of the individual mechanisms. It is further clear that the output of the combined mechanism, as would be expected, retains the reversing characteristics of the crank and connecting rod mechanism, and that the displacement curve D, FIG. 9, is symmetrical about the 0 axis, as was curve Ref. A.

Case 2

This is comparable to Case 1 except that the second harmonic version of the mechanism 30 is used, rather than the third given by curve D. Therefore:
$C_1=0$; $M=2$; $N=2$;
$F_1=1\frac{1}{3}/3$; $F_2=1/6$ The results are tabulated in Table V.

TABLE V

| Clock Angle | Unitized Displacement |
| --- | --- |
| −90° | .003520 |
| −80° | .001228 |
| −70° | .000360 |
| −60° | .000085 |
| −50° | .000015 |
| −40° | .000002 |
| −30 to +30° | Less than .000001 |
| 40° | .000002 |
| 50° | .000015 |
| 60° | .000085 |
| 70° | .000360 |
| 80° | .001228 |
| 90° | .003520 |

These results are also shown in curve E of FIG. 9, with the same observations applying as were made for curve D.

Very Long Dwells at Each End of Stroke

In the background patent, techniques were developed, for both the second and third harmonic, $N=2$ and $N=3$, to find values of $E_1$ and $E_2$, such that the displacem could be made to go through 0 at four different null angles, which are predetermined values of clock angle at which the output displacement is 0. The qualitative generic characteristics of such a condition is shown in FIG. 10. It will be noted that the output displacement of the mechanism 30, represented in FIG. 10, passes through 0 at a predetermined clock angle, defined as a null angle, at $-\theta_{N2}$; "overshoots" slightly, then returns to 0 output at a second predetermined null angle, $-\theta_{N1}$. It then "undershoots" and returns to 0 output displacement at 0 clock angle. The behavior of the mechanism 30 at positive clock angles is symmetrically opposite, but not a mirror image, of its behavior at negative clock angles. In essence, therefore, the output of the mechanism 30 can be arranged to pass through 0 output five times during a dwell and will be defined as a 5 point dwell.

As again shown in the background patent, the amplitude of the overshoot and undershoot, which will be referred to as oscillations, can be controlled by judicious selection of the null angles. Using a computer, it is possible to manipulate the null angles by trial and error, successive approximation, or iteration, to achieve the predetermined amplitudes of oscillation, and the associated factors $E_1$ and $E_2$. Generally, the four distinct oscillation amplitudes will be made equal to each other, but this need not be so.

The output displacement of the mechanism 30 is the crank angle of the crank and connecting rod mechanisms and is so labelled in FIG. 10. If the phase angle $C_1$ is 0, the resultant output of the combination mechanism will have the generic form shown in FIG. 11 as a result of the crank oscillation shown in FIG. 10. It will be noted that the output oscillation of the combination mechanism is unidirectional because of the inherent characteristics of the crank mechanism, in which the output is symmetrical about a dead center position, i.e., the output for a given angle is the same whether the angle is "before" or "after" the dead center position. This is mathematically confirmed by equation (3) since $\cos(\theta)=\cos(-\theta)$.

If a given dwell amplitude (unitized) is defined for a specific application, the following technique is useful. Equation (3) is inverted, and R is set equal to ½, whereby:

$$\cos \phi = 1 - 2D_U$$

$$\phi = \arccos(1-2D_U) \tag{16}$$

As applied to the combined mechanism, and noting the relationship between FIGS. 10 and 11, it can be seen that equation (16) defines the angle of permissible crank oscillation to yield a predetermined dwell amplitude. In Table VI is presented a tabulation of permissible crank oscillation angles as a function of dwell amplitude, for 180° output of mechanism 30 ($M=2$) which provides a long dwell at each end of the stroke.

TABLE VI

| Unitized Predetermined Dwell Amplitude | Permissible Crank Oscillation Amplitude True Degrees | Unitized Crank Oscillation 180° Index |
| --- | --- | --- |
| .00001 | ±.36237° | ±.00201 |
| .00003 | ±.62765° | ±.00348 |
| .00010 | ±1.14593° | ±.00636 |
| .00030 | ±1.98488° | ±.01103 |
| .00100 | ±3.62431° | ±.02014 |
| .00300 | ±6.27958° | ±.03489 |

With the permissible crank oscillation amplitude determined for a given predetermined dwell amplitude for the combined mechanism, from equation (16), and as illustrated by the examples of Table VI, it is possible to use these crank oscillation amplitudes to determine the null angles and the factors $E_1$ and $E_2$ which will create them. As noted above, this is accomplished by using successive approximation techniques with a computer.

Following this procedure, the values for the null angles were found which give rise to the permissible crank oscillation amplitudes which were listed in Table VI. These are listed in Table VIIA for N=3 and in Table VIIB for N=2 for a 180° index of mechanism 30.

TABLE VIIA

N = 3

| Dwell Amplitude | Null Angle 1 Clock Degrees | Null Angle 2 Clock Degrees |
|---|---|---|
| .00001 | ±36.884 | ±62.047 |
| .00003 | ±40.110 | ±68.095 |
| .00010 | ±43.661 | ±75.045 |
| .00030 | ±46.816 | ±81.563 |
| .00100 | ±50.040 | ±88.710 |
| .00300 | ±52.642 | ±95.013 |

TABLE VIIB

N = 2

| Dwell Amplitude | Null Angle 1 Clock Degrees | Null Angle 2 Clock Degrees |
|---|---|---|
| .00001 | ±44.909 | ±74.615 |
| .00003 | ±49.262 | ±82.361 |
| .00010 | ±54.273 | ±91.502 |
| .00030 | ±58.991 | ±100.389 |
| .00100 | ±64.206 | ±110.624 |
| .00300 | ±68.874 | ±120.266 |

From the null angles, such as tabulated in Tables VIIA and B, it is possible to calculate the required factors $E_1$ and $E_2$, using the method outlined in the background patent. When this is done using the specific null angle values tabulated in Tables VIIA and B, for the desired dwell amplitudes, the corresponding $E_1$ and $E_2$ factors are listed in Tables VIIIA and B.

TABLE VIIIA

N = 3

| Dwell Amplitude | Factor $E_1$ | Factor $E_2$ |
|---|---|---|
| .00001 | 1.2149 | .0913 |
| .00003 | 1.2326 | .1090 |
| .00010 | 1.2545 | .1379 |
| .00030 | 1.2762 | .1782 |
| .00100 | 1.3008 | .2483 |
| .00300 | 1.3227 | .3528 |

TABLE VIIIB

N = 2

| Dwell Amplitude | Factor $E_1$ | Factor $E_2$ |
|---|---|---|
| .00001 | 1.4947 | .2714 |
| .00003 | 1.5311 | .3037 |
| .00010 | 1.5791 | .3530 |
| .00030 | 1.6309 | .4170 |
| .00100 | 1.6969 | .5197 |
| .00300 | 1.7647 | .6603 |

The factors $E_1$ and $E_2$ tabulated above may now be used in equation (15) to calculate the unitized displacement output of the combination mechanism. Recalling that the procedure for determining $E_1$ and $E_2$, in this instance, was predicated on the mechanism 30 having an output index angle of 180°, M=2, and that the phase angle, $C_1$, was 0, it becomes possible to establish the parameters for two illustrative cases.

Case 3

$C_1=0$; $M=2$; $N=3$; $E_1=1.3008$; $E_2=0.2483$.

The factors $E_1$ and $E_2$ were arbitrarily chosen from Table VIIIA to illustrate a dwell condition at the ends of the stroke that has an amplitude of 0.001 of the total stroke using a third harmonic N=3. The factors listed above were substituted into equation (15), and the displacement calculated at suitably spaced clock angles. The results of these calculations are shown as curve F in FIG. 12, in which only the characteristics at positive clock are shown. It will be understood that the behavior at negative clock angles is a mirror image about the 0 clock angle line as shown in the generic curve, FIG. 11. From curve F, FIG. 12, it can be seen that the displacement oscillates within the predetermined dwell amplitude of 0.001 for a total of 95° or a total dwell of 190°, this represents 190/360 or 52.7% of the total cycle time. It will further be noted that the displacement curve F is tangent to the 0 displacement axis at clock angles of 50° and 80°, agreeing with the null angles for 0.001 dwell amplitude shown in Table VIIA.

The same objective of very long dwell at each end of stroke will now be illustrated using N=2, as is generically shown in FIGS. 1 and 2.

Case 4

$C_1=0$; $M=2$; $N=2$; $E_1=1.6969$; $E_2=0.5197$.

The factors $E_1$ and $E_2$ were taken from Table VIIIB for a dwell amplitude of 0.001 to permit a direct comparison of the dwell behavior for N=2 relative to curve F where N=3. Using these values again in equation (15), the results are plotted as curve G of FIG. 12. A marked improvement in the dwell length will be noted, ±118°, or a total dwell length of 236° relative to the 360° total cycle clock angle. The output is therefore stationary within a dwell amplitude of 0.001 for 236/360 or 65.5% of the total cycle.

Figure 13:
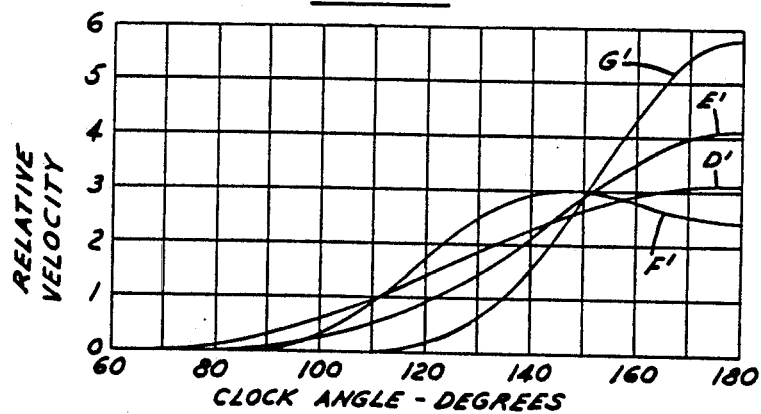
FIG. 13, a graph showing the velocity characteristics of this invention for the configurations whose dwell characteristics were shown in FIGS. 9 and 12.

While achieving long dwells is of practical important, it is also necessary to examine the kinematic behavior of the system during the movement between these dwells. As noted earlier, the velocity calculations are made using a computer and numerical differentiation rather than classical differentiation and subsequent calculation of far more involved equations than equation (15). Using these techniques, the velocities during the stroke were calculated for the four previously described cases and are shown graphically in FIG. 13. Curve D' shows the velocity characteristics of Case 1 whose dwell characteristics are shown by curve D of FIG. 9. These velocity characteristics are symmetrical about the clock angle 180°, and velocities at clock angles less than 60° are too small to be of any interest. The velocities are plotted in terms of relative velocity which is defined as the ratio of the instantaneous velocity at a given clock angle divided by the average velocity which is the total stroke divided by the time required for the clock angle to move through 360°.

Similarly, the velocity curve E' represents the conditions of Case 2 and is the counterpart of dwell curve E of FIG. 9. The velocity curve F' is for Case 3 and is the counterpart of dwell curve F in FIG. 12; and velocity curve G' represents Case 4 and is the counterpart of the dwell curve G of FIG. 12. As a broad generalization, the peak velocities for the cases in which N=2, as represented by curves E' and G' are higher than those for the case where N=3, as represented by curves D' and F', as is to be expected since the dwells for the N=2 cases are longer than for those where N=3. Interestingly, the curve F', which represents a configuration which has a longer dwell than the other third harmonic curve D', has a velocity reversal near midstroke, which is an inherent characteristics of having a large third harmonic component.

Long Dwells Between the Ends of the Stroke

In the foregoing four cases, it was shown how the dwell at each end of the stroke could be made very large as a fraction of the total cycle time per stroke; and the velocity characteristics between the ends of the stroke dependent on the conditions chosen were illustrated. Other applications arise in which it is desired to have dwells during the strokes, in addition to the reversal dwells at the ends of the stroke. Three additional cases will be used to show how this can be accomplished. The first method involves using a phase angle, $C_1$, to shift the dwell of mechanism 30 away from the reversal dwell of the crank and connecting rod mechanism. By positioning the crank on the output shaft of the mechanism 30 such that it is 90° from its dead center position when the mechanism 30 is in its center of dwell position, a value $C_1=90°$ is obtained. By further assigning the value $M=2$, whereby the output index angle of the mechanism 30 is 180°, a dwell will be created on both the forward and return midstroke. The dwell amplitude of the crank angular oscillation during dwell is arbitrarily set to $\pm 0.18°$ and the values for $E_1$ and $E_2$ obtained by computer iteration. N was set to 3, although, as previously shown, $N=2$ provides a slightly longer dwell, at the expense of higher velocities. Therefore the conditions for Case 5 were established as follows.

Case 5

$C_1=90°$; $M=2$; $N=3$; $E_1=1.196$; $E_2=0.0761$.

Figure 14:
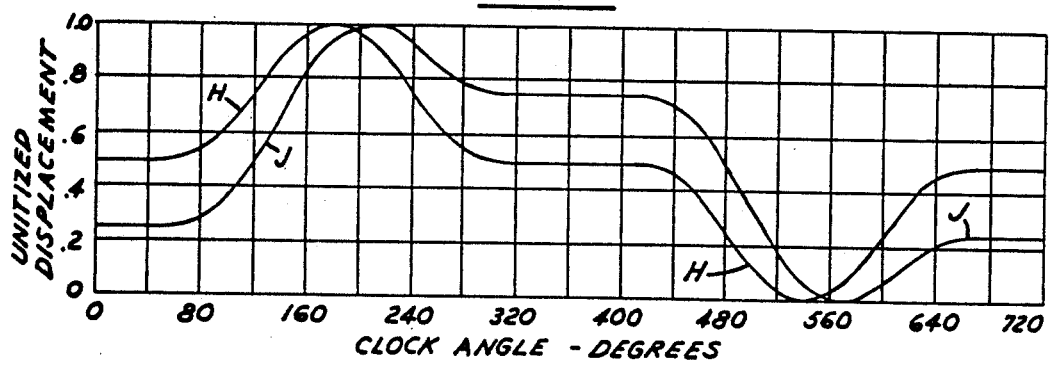
FIG. 14, an illustrative graph showing the displacement characteristics of this invention when the crank is positioned on the mechanism of FIGS. 1 and 2 with phase angles of 90° and 60°.

The results of these conditions were then calculated at suitable clock angle intervals and the results plotted as curve H, FIG. 14. The unitized displacement is shown over a clock angle interval of 720° which represents two 180° indexes of the mechanism 30, as required for the crank to move through a full 360°; this shows both the forward and return stroke. From curve H, it can be seen that a significant dwell has been created at midstroke, unitized displacement equals 0.5, while the dwells at the ends of the stroke are quite short.

In other applications, a long dwell during the stroke is desired at one position during a forward stroke and at another position during the return stroke. Within certain limitations, this can be accommodated by changing the phase angle $C_1$ to an appropriate angle different than the 90° utilized to create the conditions of curve H, while the other parameters are arbitrarily unchanged.

Case 6

$C_1=60°$; $M=2$; $N=3$; $E_1=1.196$; $E_2=0.0761$.

The results are shown by curve J of FIG. 14, in which, as noted, the phase angle $C_1$ is 60°. The intermediate long dwell is at a unitized output displacement of 0.25 on the forward stroke and at a unitized output displacement of 0.75 on the return stroke as would be expected by considering equation (14) and substituting $\gamma=0$ for the first dwell position and $\gamma=180°$ for the second dwell position. Clearly then, for $M=2$, the two dwell positions are always the same distance away from the previous reversal dwell; stated another way, the sum of the unitized displacements for the two intermediate dwell positions is always equal to 1. This can be modified by an intermediate linkage to the final drive point.

Long Dwells at Ends of Stroke and at Midstroke

Using the parameters illustrated by Cases 5 and 6, the dwells at the ends of the strokes were quite short, as is to be expected for a crank rotating at some angular velocity. Applications arise, however, in which a long dwell is required at the ends of the stroke as well as at the midpoints of the stroke. This can be achieved by selecting a 90° output index angle for the mechanism 30, which is accomplished by setting $M=4$. A five point dwell, as illustrated by FIG. 10 was selected with a dwell amplitude of $\pm 0.09°$ (0.001 unitized) for the crank oscillation, whereupon the final parameters, calculated as previously explained, are as follows.

Case 7

$C_1=0$; $M=4$; $N=3$; $E_1=1.196$; $E_2=0.0761$.

Figure 15:
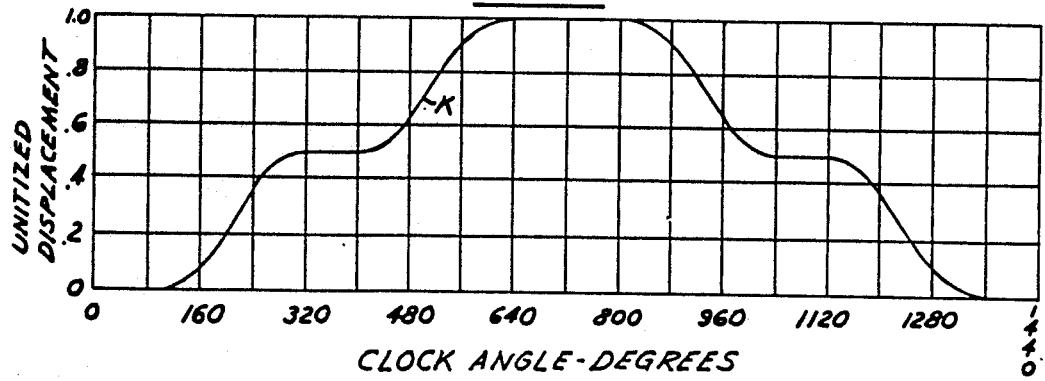
FIG. 15, an illustrative graph showing the displacement characteristics of this invention when the mechanism of FIGS. 1 and 2 is configured to produce a 90° index angle, with 0 phase angle.

The results of the calculations are shown by curve K of FIG. 15. This is plotted for a total clock angle range of 1440° as is required since four indexes of the mechanism are required for each revolution of the crank and each such index requires 360° of clock angle. It will be noted, from curve K, that, in addition to having long dwells at midstroke, the dwells at the ends of the stroke are significantly longer than those for Cases 5 and 6 represented by curves H and J of FIG. 14.

Long Dwell at One End of Stroke and Short Dwell at Other End

Some applications arise in which it is desired to have a reversing mechanism which has a very long dwell at one end of the stroke and a relatively short dwell at the other end of the stroke. This requirement can be met by this invention by using an output index angle of 360° for the mechanism 30, whereby $M=1$, and positioning the crank such that the phase angle is 0, i.e., $C_1=0$. Clearly, the crank is then at one dead center position when the mechanism 30 is in dwell; at the crank's opposite dead center position, the mechanism 30 will be at its mid index position and will be rotating at some relatively high angular velocity. This situation gives rise to the difference in system dwells at opposite ends of the stroke. Two specific examples are presented, one in which $N=2$, the other in which $N=3$. In each example, a five point dwell having a dwell amplitude of 0.001 was arbitrarily selected. This gave rise to the following parameter combinations.

Case 8

Figure 16:
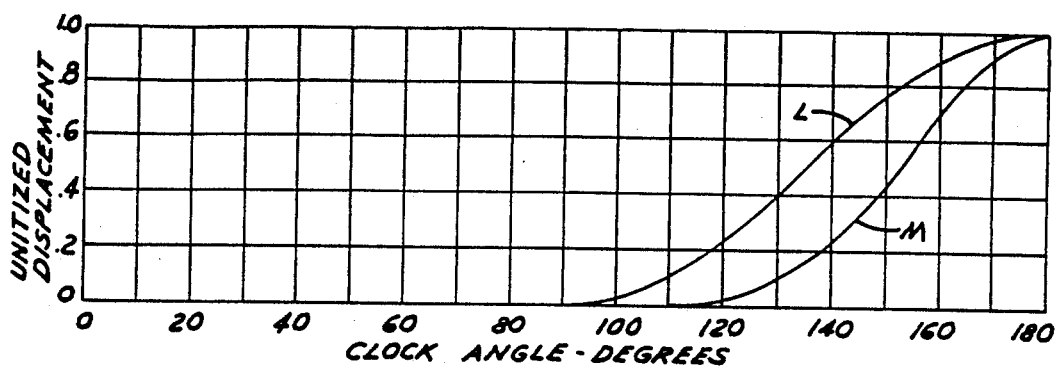
FIG. 16, an illustrative graph showing the displacement characteristics of this invention when the mechanism of FIGS. 1 and 2 is configured to produce a 360° index angle, with 0 phase angle, and using a second and third harmonic.

$C_1=0$; $M=1$; $N=3$; $E_1=1.273$; $E_2=0.1703$;

The results of the calculations using these parameters in equation (15) are shown by curve L in FIG. 16.

Case 9

$C_1=0$; $M=1$; $N=2$; $E_1=1.622$; $E_2=0.4048$.

The results of the calculations using these parameters are shown by curve M in FIG. 16.

Curve L is based on using $N=2$, and curve M is based on using $N=3$. In each instance, the parameters $E_1$ and $E_2$ were established by computer successive approximation such that the dwell amplitude of the total system was 0.001 as previously noted. The curves are plotted for only 180° of clock angle, since they are symmetrical about both the 0° and 180° clock angles. As expected from the knowledge of FIGS. 9 and 12, the dwell at one end of the stroke is greater for the $N=2$ situation relative to the $N=3$ situation. As a consequence, it follows that because of the compensating higher midstroke angular velocity of the N=2 situation, the dwell at the other end of stroke is shorter for N=2 than for N=3, or stated another way, the reversal is faster for N=2 than for N=3.

Three Point Dwells

In the foregoing Cases 3-9, the parameters $E_1$ and $E_2$ were determined using a five point dwell as described in connection with FIGS. 10 and 11. This was more fully described in the background patent. As also more fully described in the background patent, it is also possible to arrange the mechanism 30 such that its displacement characteristic in the dwell area only goes through 0 three times, rather than five; this will be defined as a three-point dwell. The primary objective in reducing the number of dwell points from 5 to 3 is that, in so doing, it becomes possible to find combinations of $E_1$ and $E_2$ which permit greater control over the kinematics of the movement between the dwells. In connection with the independent mechanism 30, numerous illustrative examples are presented in the background patent, including the kinematic curves of FIGS. 12, 13, 30 and 31 of said patent.

Figure 17:
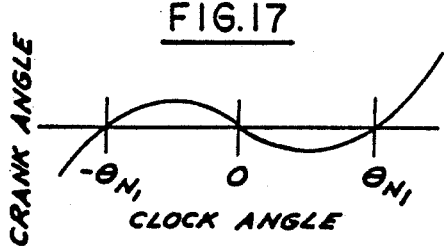
FIG. 17, a generic dwell characteristics curve showing the behavior of the mechanism of FIS. 1 and 2 operating in a three point dwell configuration.

The generic characteristics of the output displacement of the mechanism 30 in the three point dwell mode is shown in FIG. 17. Since this displacement becomes the crank angle of the crank and connecting rod mechanism it is again so labeled. There are several methods which may be employed to create a three point dwell, as will subsequently be shown. Assuming that the parameters $E_1$ and $E_2$ have been established to create a three point dwell condition for the mechanism 30, the output angular displacement of the mechanism 30, or crank angle, are generically shown by the curve of FIG. 17. It can be seen that the crank "overshoots" its 0 position after crossing the zero point at some negative clock angle, which is defined as null angle $-\theta_{N1}$. The crank angle displacement then reverses and passes through its 0 position again at a clock angle of 0, then undershoots before reversing to progress forward, again crossing the 0 displacement position at some positive clock angle defined as null angle $\theta_{N1}$. In essence, when the parameters $E_1$ and $E_2$ are determined such as to create a three point dwell, the angular output displacement of mechanism 30 undergoes a double reversal crossing the 0 line three times, whereas when the parameters $E_1$ and $E_2$ are determined to create a five point dwell as previously described, the angular output displacement, which is crank angle, undergoes four reversals and crosses the zero line five times.

Figure 18:
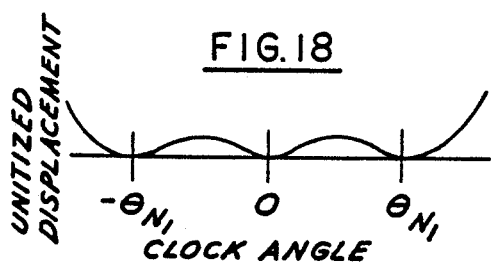
FIG. 18, a generic dwell characteristic curve, showing the output of this invention when the crank is positioned on the mechanism of FIGS. 1 and 2, such that the crank is at a dead center position when the mechanism of FIGS. 1 and 2 is in the center of dwell and configured to create a three point dwell.

If the crank is positioned on the output shaft of the mechanism 30 such that it is in its dead center position when the mechanism is in the center of its dwell, the unitized output displacement of this invention will be as shown by the generic curve of FIG. 18 which is derived from FIG. 17 by the same technique used in describing the curve of FIG. 11 derived from the curve of FIG. 10. In essence, the unitized output displacement of the crank is 0 at $-\theta_{N1}$, 0, and $\theta_{N1}$ where the crank angle is 0, and very slightly positive, wherever the crank angle is slightly positive or negative, again as described in connection with FIG. 11.

The method of determining the factors $E_1$ and $E_2$ for the three point dwell is comparable to that used for finding the five point dwells. Using the techniques used in finding the groups of solutions for three point dwells shown in the background patent, it is possible to calculate the total dwell amplitude, then adjust either $E_1$ or $E_2$ to obtain the desired dwell amplitude. The non used $E_1$ or $E_2$ (for finding the desired dwell amplitude) is then varied to approximate the desired kinematic objective, but for each variation in the variable ($E_1$ or $E_2$) used to seek the kinematic objective, it is necessary to reevaluate the variable ($E_1$ or $E_2$) which creates the dwell amplitude. This is again a successive approximation technique for which a computer is practically indispensable.

Even without starting with the knowledge of the background patent, it is possible to find $E_1$ and $E_2$ as long as they are mathematically obtainable. A value is arbitrarily assigned to either $E_1$ or $E_2$ and the non-assigned variable $E_1$ or $E_2$ is varied to create the desired dwell amplitude, again using equation (15) as the basis for making the unitized displacement calculations. The assigned variable $E_1$ or $E_2$ then can be modified by successive approximation, to provide the kinematic objectives for movement during the stroke, two examples of which will now be shown.

Long Dwell at Ends of Stroke and Nearly Constant Velocity During Stroke

Two cases will be investigated to meet the above conditions, one in which N is arbitrarily selected as 2 and the second in which N is arbitrarily selected as 3. Utilizing the information of the previous cases, M was set equal to 2 to create a long dwell at each end of the stroke. The dwell amplitude was again arbitrarily selected as 0.001 in unitized displacement coordinates.

Figure 12:
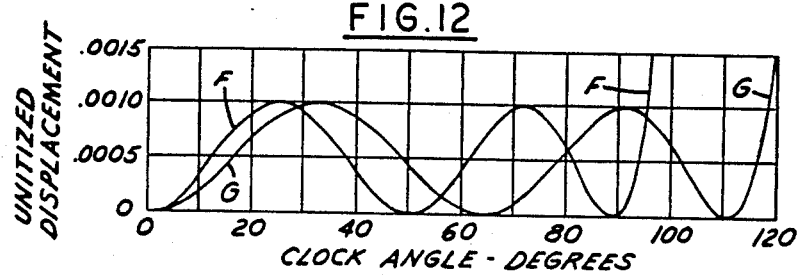
FIG. 12, specific dwell characteristics curves of this invention configured to provide a dwell amplitude of 0.001 using a second and a third harmonic.

With these conditions and parameters established and N set equal to 2, $E_2$ was set from $-0.1$ to $-0.3$ in steps of 0.01 utilizing the precedent of curve B FIG. 12 of the background patent. For each of these selected values of $E_2$, a corresponding value of $E_1$ was found, by successive approximation, to create a dwell displacement of 0.001. With $E_1$ and $E_2$ thus established, the velocity characteristics over the stroke were calculated at suitable clock angles using equation (15) and numerical differentiation. From these many combinations of $E_1$ and $E_2$, a result was selected which was judged best to meet the aforesaid requirements and is given as follows.

Case 10

$C_1=0$; $M=2$; $N=2$; $E_1=0.9190$; $E_2=0.22$.

Figure 19:
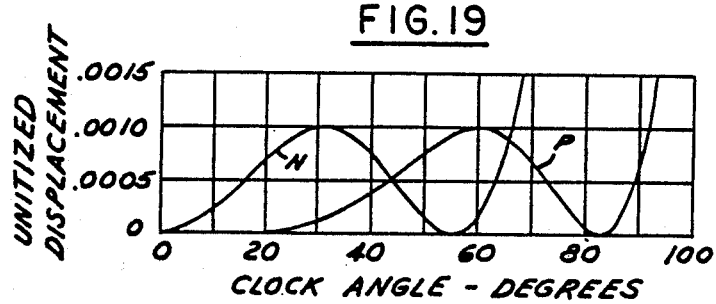
FIG. 19, an illustrative graphical presentation of the dwell characteristics of this invention when the mechanism of FIGS. 1 and 2 is configured to produce a three point dwell and the phase angle is 0; for both the second and third harmonic arrangements.
Figure 20:
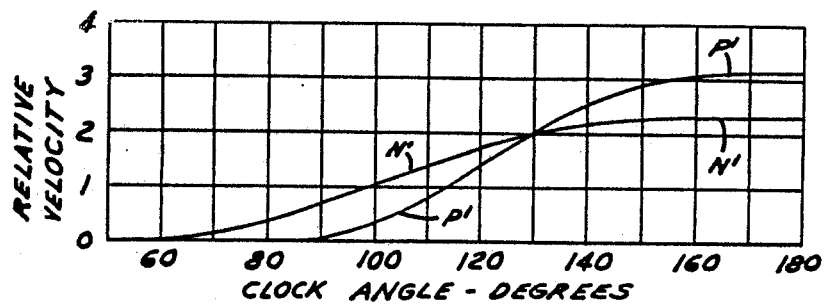
FIG. 20, a graph showing the velocity characteristics of this invention for the configurations whose dwell characteristics were presented in FIG. 19.

The dwell characteristics for this combination of parameters are shown as curve N in FIG. 19, with these characteristics symmetrical about 0 clock angle as demonstrated by the generic dwell curve FIG. 18. The velocity characteristics of this combination are shown by curve N' of FIG. 20, in which the velocities below a clock angle of 50° are too small to be of interest, and the velocities are symmetrical about a clock angle of 180°. It should be pointed out that the dwells and velocities for the "neighboring" solutions found for $E_2=-0.21$ and $-0.23$ are almost imperceptibly different. These combinations are:

$E_2=-0.21$; $E_1=0.9361$; $E_2=-0.23$; $E_1=0.9018$.

Using these same procedures, except with N=3, rather than N=2 as for Case 10, the following $E_1$ and $E_2$ was selected to best meet the requirements.

Case 11

$C_1=0$; $M=2$; $N=3$; $E_1=1.355$; $E_2=0.11$.

The dwell characteristics for this combination of parameters are shown by curve P of FIG. 19 and the velocity characteristics are shown by curve P' of FIG.

20, with the same symmetries described in connection with curves N and N'.

Clearly, the number of variety of kinematic objectives which can be satisfied by this invention is extremely large. The disclosed cases are illustrative only. Each of the cases involved a dwell of one type or another; but this is not to say the invention is usable only when dwells are required. It can be generalized only that it is usable to meet any kinematic objective which can be approximated by equation (15), and this in turn is determined to a large degree by the knowledge, experience and ingenuity of a designer applying this equation, and the mechanism it represents.

All the performance curves were derived on the basis of equation (15), which, it will be recalled, was derived after making some approximating simplifications. However, in rigorously calculating the performance of these systems without approximations by numerical computer calculations (classical math non-approximating calculations become hopelessly complex), it has been found that a very high degree of correlation can be found between the characteristics described herein and the exact characteristics numerically calculated. This has involved adjusting, by successive approximations the distances between axes $A_0$ and $A_4$ and between axes $A_1$ and $A_2$ as well as the aforesaid distances between axis $A_2$ and $A_3$ ($E_1$) and between axes $A_0$ and $A_1$ ($E_2$).

In the illustrative embodiments of FIGS. 1, 2, 7 and 8, the drive is shown directly connected to and driving the input shaft 32, or the first rotating "pair" which is comprised of the input shaft 32 and the eccentric segments 34 and gear 36. It is also possible, where desired, to mount the driving motor and gear reducer on the tangential links 38, as is shown in FIGS. 40 and 41 of the reference patent, in which case it is possible to drive the second rotating "pair" comprised of shaft 42 with the driving gear 40 mounted concentrically thereon, and the eccentric gear 48 mounted eccentrically thereon through eccentric plate 46.

I claim:

1. A reciprocating mechanical drive system capable of providing an extremely wide variety of kinematic objectives, including very long dwells at the ends of the stroke, unequal dwells at opposite ends of the stroke, intermediate dwells between the ends of a stroke, and non-symmetrical movement when moving in one direction, as compared to the movement in the other direction, comprising:
   a. a combination mechanism comprising a rotary drive means which drives a reciprocating output drive system, and in which said rotary drive means comprises:
      1. a frame,
      2. an output shaft member mounted for rotation in said frame,
      3. an output member mounted on said output shaft member and adapted for tangential driving and having a given pitch radius,
      4. a first rotating pair supported in said frame comprising:
         (i) a first rotating member mounted for rotation in said frame,
         (ii) a first eccentric member mounted eccentrically, in non-rotational relation to, and on said first rotating member,
      5. a second rotating pair mounted in fixed spatial relationship with said first rotating pair comprising:
         (i) a second rotating member,
         (ii) a second eccentric member, having a given pitch radius, mounted eccentrically in non-rotational relation to, and on said second rotating member,
      6. means connecting for rotation said first rotating pair and said second rotating pair for substantially an integral angular velocity ratio,
      7. means connecting said output member and said second eccentric member in a driving relationship, and
      8. power means connected to one of said rotating pairs to impart a rotary motion to that of said rotating pair; whereby rotation of said rotary pair by said power means at a presumed substantially constant angular velocity causes said output shaft member to undergo a series of acceleration-deceleration cycles and the angular distance traversed by said output shaft member during one such cycle is known as the index angle,
   b. and in which said reciprocating output drive system comprises:
      1. a crank member mounted at one end to said output shaft member,
      2. connecting rod means journalled at one end to the other end of said crank member,
      3. reciprocating output means mounted for reciprocation in said frame, and pivotally connected to the other end of said connecting rod means.

2. A reciprocating mechanical drive system as in claim 1 in which said power means is connected to said first rotating member.

3. A reciprocating mechanical drive system as in claim 1 in which said output member has a pitch radius which is two times the pitch radius of said second eccentric member, whereby the index angle of said output shaft member is 180°.

4. A reciprocating mechanical drive system as in claim 1 in which the eccentricity between said first eccentric member and said first rotating member, and the eccentricity between said second eccentric member and said second rotating member are proportioned to provide acceleration-deceleration index cycles of said output shaft member with such cycles separated by an approximate stoppage of said output shaft member termed a dwell; and in which said crank member is positioned on said output shaft member, such that when said output member is positioned in the center of a said dwell, said crank member and said connecting rod member are substantially colinear.

5. A reciprocating mechanical drive system as in claim 1 in which the pitch radii of said output member and said second eccentric member are equal, whereby the index angle of said output shaft member is 360°.

6. A reciprocating mechanical drive system as in claim 1 in which said output member has a pitch radius which is four times the pitch radius of said second eccentric member, whereby the index angle of said output shaft member is 90°.

7. A reciprocating mechanical drive system as in claim 1 in which said crank member is positioned on said output shaft member, such that when said rotary drive means is positioned equally between any two adjacent indexing cycles, said crank member is positioned by some predetermined phase angle from a reference position, in which said crank member and said connecting rod member are substantially colinear.

8. A reciprocating mechanical drive system capable of providing an extremely wide variety of kinematic objectives, including very long dwells at the ends of the stroke, unequal dwells at opposite ends of the stroke, intermediate dwells between the ends of a stroke, and non-symmetrical movement when moving in one direction, as compared to the movement in the other direction, comprising:

a. a combination mechanism comprising a rotary drive means which drives a reciprocating output drive system, and in which said rotary drive means comprises:
1. a frame,
2. an output shaft member mounted for rotation in said frame,
3. an output gear member mounted on said output shaft member and adapted for tangential driving and having a given pitch radius,
4. a first rotating pair supported in said frame comprising:
   (i) a first rotating member mounted for rotation in said frame,
   (ii) a first eccentric gear member mounted eccentrically, in non-rotational relation to, and on said first rotating member,
5. A second rotating pair mounted in fixed spatial relationship with said first rotating pair comprising:
   (i) a second rotating member,
   (ii) a second eccentric gear member, having a given pitch radius, mounted eccentrically in non-rotational relation to, and on said second rotating member,
6. means connecting for rotation said first rotating pair and said second rotating pair for substantially an integral angular velocity ratio,
7. means connecting said output gear member and said second eccentric gear member in a driving relationship, and
8. power means connected to one of said rotating pairs to impart a rotary motion to that of said rotating pair; whereby rotation of said rotary pair by said power means at a presumed substantially constant angular velocity causes said output shaft member to undergo a series of acceleration-deceleration cycles and the angular distance traversed by said output shaft member during one such cycle is known as the index angle, b. and in which said reciprocating output drive system comprises:
1. a crank member mounted at one end to said output shaft member,
2. connecting rod means journalled at one end to the other end of said crank member,
3. reciprocating output means mounted for reciprocation in said frame, and pivotally connected to the other end of said connecting rod means.

9. A reciprocating mechanical drive system as in claim 8 in which said power means is connected to said first rotating member.

10. A reciprocating mechanical drive system as in claim 8 in which said output gear member has a pitch radius which is two times the pitch radius of said second eccentric gear member, whereby the index angle of said output shaft member is 180°.

11. A reciprocating mechanical drive system as in claim 8 in which the eccentricity between said first rotating member and said first eccentric gear member and the eccentricity between said second rotating member and said second eccentric gear member are proportioned to provide acceleration-deceleration index cycles of said output shaft member with such cycles separated by an approximate stoppage of said output shaft member termed a dwell; and in which said crank member is positioned on said output shaft member, such that when said output member is positioned in the center of a said dwell, said crank member and said connecting rod member are substantially colinear.

12. A reciprocating mechanical drive system as in claim 8 in which the pitch radii of said output gear member and said second eccentric gear member are equal, whereby the index angle of said output shaft member is 360°.

13. A reciprocating mechanical drive system as in claim 8 in which said output gear member has a pitch radius which is four times the pitch radius of said second eccentric gear member, whereby the index angle of said output shaft member is 90°.

14. A reciprocating mechanical drive system as in claim 8 in which said crank member is positioned on said output shaft member, such that when said rotary drive means is positioned equally between any two adjacent indexing cycles, said crank member is positioned by some predetermined phase angle from a reference position, in which said crank member and said connecting rod member are substantially colinear.

* * * * *